United States Patent
Zhang et al.

(10) Patent No.: US 10,915,305 B2
(45) Date of Patent: Feb. 9, 2021

(54) REDUCING COMPILATION TIME FOR COMPUTER SOFTWARE

(71) Applicant: International Business Machines Corporation, Armonk, NY (US)

(72) Inventors: Yuheng Zhang, Shanghai (CN); Jiu Fu Guo, Shanghai (CN); Kang Zhang, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/367,474

(22) Filed: Mar. 28, 2019

(65) Prior Publication Data

US 2020/0310768 A1 Oct. 1, 2020

(51) Int. Cl.
*G06F 8/41* (2018.01)

(52) U.S. Cl.
CPC .................... *G06F 8/443* (2013.01)

(58) Field of Classification Search
None
See application file for complete search history.

(56) References Cited

U.S. PATENT DOCUMENTS

| | | | |
|---|---|---|---|
| 5,966,538 A | 10/1999 | Granston | |
| 6,170,083 B1 | 1/2001 | Adl-Tabatabai | |
| 6,427,234 B1 | 7/2002 | Chambers | |
| 7,120,906 B1 | 10/2006 | Stephenson | |
| 9,535,673 B1 | 1/2017 | Cui | |
| 2006/0048114 A1 | 3/2006 | Schmidt | |
| 2007/0294512 A1* | 12/2007 | Crutchfield | G06F 8/443 712/200 |
| 2009/0193402 A1* | 7/2009 | Bashkansky | G06F 8/443 717/145 |
| 2010/0153934 A1* | 6/2010 | Lachner | G06F 9/5011 717/146 |
| 2010/0313079 A1* | 12/2010 | Beretta | G06F 9/5055 714/48 |
| 2011/0271290 A1* | 11/2011 | Bodin | G06F 9/44521 719/330 |
| 2014/0082597 A1* | 3/2014 | Chafi | G06F 8/443 717/148 |
| 2018/0101370 A1* | 4/2018 | Huang | G06F 8/443 |

FOREIGN PATENT DOCUMENTS

WO      WO-9942925 A1 *  8/1999  ............... G06F 8/44

* cited by examiner

*Primary Examiner* — Ryan D. Coyer
(74) *Attorney, Agent, or Firm* — Daniel R. Simek

(57) ABSTRACT

A method for controlling a compile a software application. The method includes at least one computer processor generating, from source code corresponding to a software application, a plurality of pre-optimization intermediate representations (IRs) of functions associated with the software application. The method further includes generating a plurality of post-optimization IRs of the functions associated with the software application by executing one or more optimization routines on the plurality of pre-optimization IRs of functions. The method further includes determining a set of IRs of functions, from the plurality of generated pre-optimization IRs of the functions associated with the software application and the generated plurality of post-optimization IRs of the functions associated with the software application. The method further includes converting a determined set of IRs of functions to an executable version of the software application.

15 Claims, 5 Drawing Sheets

FIG. 2a

| OPTIMIZATION ROUTINE (OR) | OR1 | OR2 | OR3 | OR4A | OR4B | OR4C | OR5 | OR6 | OR7 | OR8 | OR9 | OR10 |
|---|---|---|---|---|---|---|---|---|---|---|---|---|
| INVOKE BY OPTIMIZATION LEVEL | 1,2,3,4,5 | 1 | 2 | 1 | 2 | 3,4,5 | 1,2 | 1,2 | 2,3 | 4 | 4,5 | 5 |

| OR-ID | OR1 | OR2 | OR3 | OR4A | OR4B | OR4C | OR5 | OR6 | OR7 | OR8 | OR9 | OR10 |
|---|---|---|---|---|---|---|---|---|---|---|---|---|
| F-# | 1,1 | 0,0 | 1,0 | 0,1 | 1,1 | 0,1 | 1,0 | 1,1 | 1,1 | 0,U | 0,U | 0,U |
| F-1 | 1,0 | 0,0 | 1,1 | 0,0 | 1,1 | 0,1 | 1,1 | 1,0 | 1,1 | 0,U | 0,U | 0,U |
| F-2 | 1,0 | 0,0 | 1,1 | 0,0 | 1,1 | 0,1 | 1,1 | 1,0 | 1,1 | 0,U | 0,U | 0,U |
| F-3 | 1,_ | 0,_ | 1,_ | 0,_ | 1,_ | 0,_ | 1,_ | 1,_ | 1,_ | 0,U | 0,U | 0,U |

211 (L,M) — 212; 213, 214, 215, 216, 216A, 217A $O_S$, 217B $E_P$

FIG. 2c $O_S, \Delta F, E_P, E_C$ — 218

REDUCING COMPILATION TIME FOR COMPUTER SOFTWARE

BACKGROUND OF THE INVENTION

The present invention relates generally to the field of computer software, and more particularly to program compiling.

A compiler is a computer program that transforms computer code written in one programming language (a source language) into another programming language (the target language). Compilers are a type of translator that support digital devices, primarily computers. A compiler is primarily used for programs that translate source code from a high-level programming language to a lower level language (e.g., assembly language, object code, or machine code) to create an executable program. A compiler performs one or more of the following operations: preprocessing, lexical analysis, parsing, semantic analysis (syntax-directed translation), conversion of input programs to an intermediate representation, code optimization and code generation. Compilers implement these operations in phases that promote efficient design and correct transformations of source input to target output.

A software program written in a compiled language is translated by running the source code of a compiler that produces very efficient code that an be executed any number of times. The overhead (e.g., computing resources) for the translation is incurred just once, in response to compiling the source code; thereafter, the program can be directly loaded and executed. In contrast, a software program written in an interpreted language must be parsed and interpreted each time the software program is utilized; thereby utilizing extra computing resources for each execute the software program.

SUMMARY

According to an aspect of the present invention, there is a method, computer program product, and/or system controlling a compile a software application. In an embodiment, the method includes one or more computer processors generating, from source code corresponding to a software application, a plurality of pre-optimization intermediate representations (IRs) of functions associated with the software application. The method further includes generating a plurality of post-optimization IRs of the functions associated with the software application by executing one or more optimization routines on the plurality of pre-optimization IRs of functions. The method further includes determining a set of IRs of functions, from the plurality of generated pre-optimization IRs of the functions associated with the software application and the generated plurality of post-optimization IRs of the functions associated with the software application. The method further includes converting a determined set of IRs of functions to an executable version of the software application.

BRIEF DESCRIPTION OF THE DRAWINGS

FIG. 2a depicts an illustrative example of a table of optimization routines associated with a software compiler, in accordance with an embodiment of the present invention.

FIG. 2b depicts an illustrative example of a set of information within a table associated with compiling a software application, in accordance with an embodiment of the present invention.

FIG. 2c depicts an illustrative example of another set of information for inclusion within a table associated with compiling a software application, in accordance with an embodiment of the present invention.

DETAILED DESCRIPTION

Figure 1:
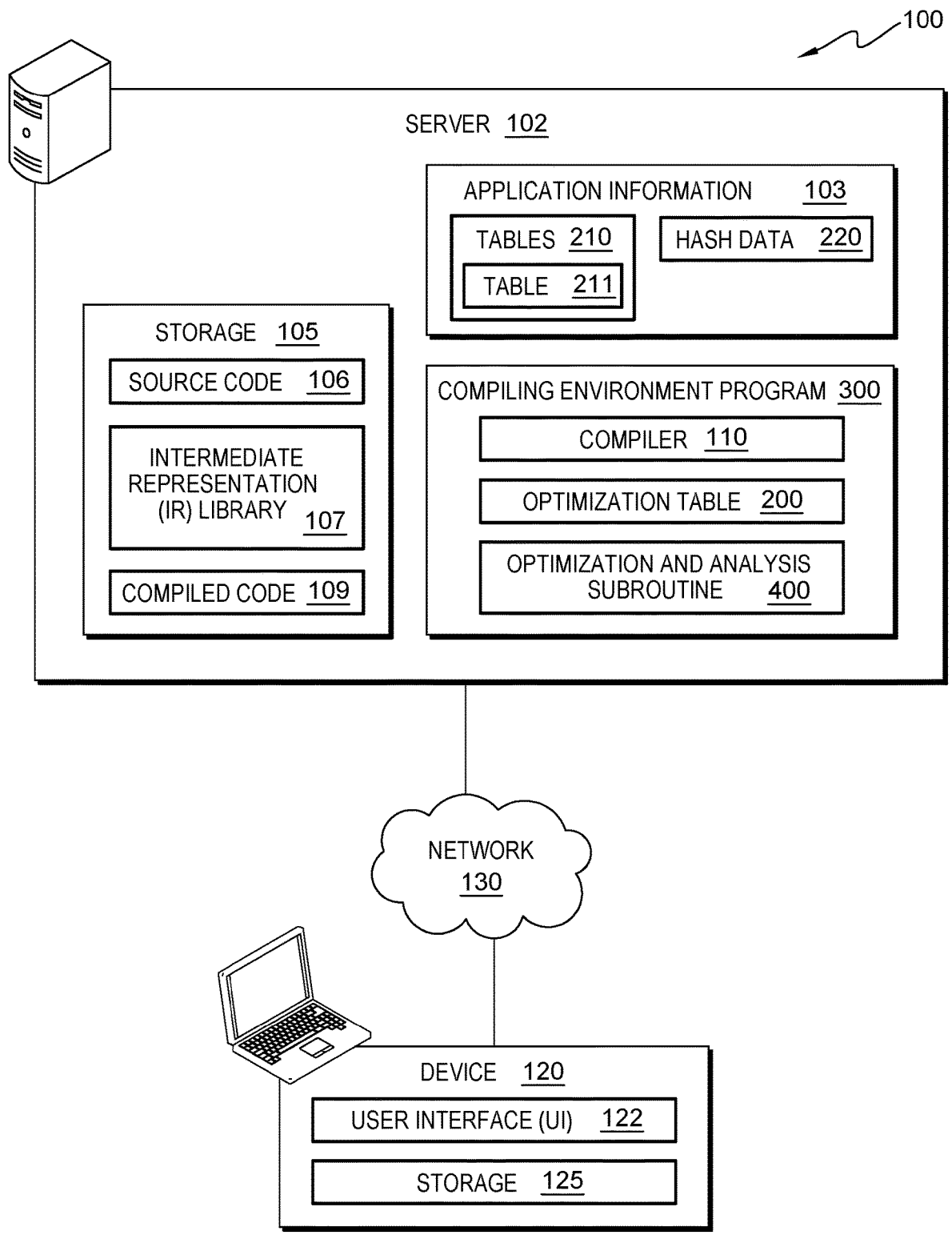
FIG. 1 illustrates a networked-computing environment associated with compiling software, in accordance with an embodiment of the present invention.

Embodiments of the present invention recognize that feedback-direct compiling of a software application can improve runtime performance of compiled software application. Embodiments of the invention also recognize that state-of-the-art compilers pursue aggressive compile optimization and runtime performance improvements. However, such aggressive compile optimization, based on an optimization level selected for the compiler, can significantly increase the duration associated with compiling the software application. Embodiments of the present invention recognize that a compiler can parse the source code of a software application to generate intermediate representations (IRs) of functions that are subsequently optimized prior to generating the executable form of the software application.

Embodiments of the present invention recognize that the optimization routines of a compiler are utilized to improve the runtime performance of a software application. In addition, if a compiler applies multiple optimization routines to an IR of a function during an optimization phase, then there may be a hierarchy of improvements (e.g., runtime reductions) among the optimized IR of a function output by a respective optimization routine. A higher-level optimization routine is expected to generate a greater runtime performance improvement than a lower-level optimization routine. However, embodiments of the present invention recognize that higher-level optimization routines execute longer to optimize an IR of a function and consume more computing resources than lower-level optimization routines. Embodiments of the present invention also recognize that some IRs of functions cannot be optimized beyond a certain point; therefore, executing other optimization routines may provide no additional runtime improvement but increase the compile duration and consume computing resources.

Embodiments of the present invention recognize that although feedback-directed compiling improves the runtime performance of a software application. Feedback-directed compiling utilizes a global optimization level setting for a compiler to control which of the hundred's optimization passes or routines are executed for each IR of a function, even though only some of the optimization routines may affect the IR of a function. Therefore, feedback-directed compiling wastes time and computing resources executing optimization routines that do not improve the execution of a function (e.g., are "ineffective"). Embodiments of the present invention recognize that in the early phases of developing a software application that long compile durations adversely affect (e.g., delay) testing, debug, and evolution of the software application, which also affects the productivity of users (e.g., software developers).

Embodiments of the present invention reduce a duration associated with compiling a software application by instructing a compiler to selectively execute one or more optimization routines invoked by an optimization level of the compiler among a plurality of IRs of functions generated by the compiler based on an effectiveness status determined for each IR of a function and optimization routine combination. Embodiments of the present invention identify a change to an IR of a function by determining a hash value corresponding to the function before and after an optimization routine is applied to the IR of the function. In response to determining that an optimization routine does not improve an IR of a function (e.g., the hash vales are the same), embodiments of the present invention indicate (e.g., flag) that the optimization routine is "ineffective" for a respective IR of a function. During a subsequent compile of the software application, embodiments of the present invention do not apply an optimization routine flagged as ineffective for an IR of a function to the IR of the function.

Embodiments of the present invention also compare hash values of an IR of a function among optimization routines to determine when executing ever more sophisticated optimization routines ceases to further improve an IR of a function. Embodiments of the present invention can reduce the duration for subsequent iterations of compiling the software application by identifying ineffective optimization among optimization routines for an IR of a function; thereby, further reducing computing resource utilized for compiling the software application.

Embodiments of the present invention can store various elements associated with compiling the software application for each version of the application and/or compiling iteration, enabling the stored elements, such as IRs of functions and hash values corresponding to IRs of functions to be utilized in subsequent compiles of the software application. Further, embodiments of the present invention can identify whether various elements of the software application change between compiles. In response to identifying unchanged elements, embodiments of the present invention can import (e.g., copy) one or more unchanged elements into the compiling processes of the software application; thereby, further reducing the duration and/or resource usage associated with compiling the software application. Some embodiments of the present invention are capable with existing parallel build methodologies, such as GNU make to further reduce the build time for a software application and improve productivity.

As one skilled in that art will appreciate, embodiments of the preset invention provide additional controls for a compiler enabling selective execution of optimization routines for IRs of functions of a software application without intervention by a user of the compiler. Thus, at least one aspect of computing technology is enhanced. Embodiments of the present invention reduce the compile duration for a software application and improve the productivity of a software developer, thereby forming a first practical application. In addition, by selectively executing optimization routines of the compiler with or without retrieving optimized IRs of functions that did not change between compile iteration, the operation of a computing system is improved by reducing the computing resources utilized while compiling the software application. Further, embodiments of the present invention can be incorporated within an integrated development environment as another practical application of the present invention.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked-computing environment 100 in an embodiment, in accordance with the present invention. An embodiment of computing environment 100 includes server 102 and device 120 interconnected over network 130. Many modifications to the depicted environment may be made by those skilled in the art without departing from the scope of the invention as recited by the claims.

Server 102 and device 120 may be laptop computers, tablet computers, system consoles, personal computers (PCs), personal digital assistants (PDAs), smart phones, wearable devices (e.g., digital eyeglasses, smart glasses, a smart watch), or any programmable computer systems known in the art. In some embodiments, server 102 and device 120 represent computer systems utilizing clustered computers and components (e.g., database server computers, application server computers, file server computer, network-attached storage devices, etc.) that act as a single pool of seamless resources when accessed through network 130, as is common in data centers and with cloud-computing applications. In general, server 102 and device 120 are representative of any programmable electronic devices or combination of programmable electronic devices capable of executing machine readable program instructions and communicating via network 130. Server 102 and device 120 may include components, as depicted and described in further detail with respect to FIG. 5, in accordance with embodiments of the present invention.

Server 102 includes application information 103, storage 105, application information 103, and compiling environment program 300. Server 102 can additionally include various programs, libraries, and databases (not shown), such as program language libraries, one or more integrated development environments (IDEs), one or more hash algorithms (e.g., hash functions), a web interface associated with one or more programs, etc. In various embodiments, server 102 utilizes network 130 to access other computing systems (not shown) that include other programs and/or services utilized to, code, develop, and/or compile software applications. In some embodiments, server 102 includes a plurality of instances of application information 103 and/or corresponding instances of storage 105 that are designated for a specific user, project, and/or business.

In an embodiment, application information 103 includes, information associated with compiling one or more software applications (not shown), tables 210, and hash data 220. Information associated with compiling one or more software applications includes, but is not limited to, user preferences, constraints, and/or dictates related to compiling a software application on server 102; information associated with one or more compiling iterations of the software application; and parameters and settings associated with compiler 110 for compiling one or more iterations of the software application, such as an optimization level associated with a compile iteration and dependencies related to a computing system that host the compiled software application; documentation associated with a software application; criteria associated with sorting, replacing and/or archiving IRs of functions, post optimization and/or pre-optimization within IR library 107, etc. In an example, user preferences, constraints, and/or dictates related to compiling a software application may include: a compile speed/compile efficiency preference, preferences that affect rules related to applying optimization routines, a hash function dictate, storage dictates associated hash value data and IRs of functions, a dictate associated with re-using IRs of functions within IR library 107, a compile time constraint (e.g., duration), etc.

Tables 210 are related to one or more software applications that a user compiles on server 102. Tables 210 includes a plurality of instances of table 211 (discussed in further detail with respect to FIG. 2b). In an example, data structures within tables 210 may be tables, associative arrays, 3-D arrays, matrices, and/or databases associated with one or more software applications of a user that are compiled on server 102. In an embodiment, tables 210 also includes linked tables or cross-references information among tables, such as a list of functions associated with a version of a software application; an indication of change corresponding to a function; information respectively associated with an optimization level invoked in response to compiling the software application; a plurality of status indications respectively associated with respective combinations of function identifiers (e.g., F-#), optimization routine identifiers (e.g., OR-ID), and optimization levels; and links to information within IR library 107 and/or hash data 220. In a further embodiment, table 210 includes one or more tables related to time-based information associated with compiling the software application, such as total compile duration associated with an optimization level, an optimization durations respectively associated with an IR of a function/optimization routine combinations, etc.

Hash data 220 may be structured as tables, associative arrays, matrices, and/or databases associated with one or more software applications that are compiled on server 102. In one embodiment, hash data 220 includes a plurality of hash values (e.g., pre-optimization hash values and/or post-optimization hash values) corresponding to IRs of functions are generated by a hash function/algorithm utilized by compiling environment program 300 and/or optimization and analysis subroutine 400. In some embodiments, hash data 220 is further associated with each version of a software application and/or compile iteration that is compiled on server 102. In various embodiments, information within hash data 220 is respectively associated with IRs of functions within IR library 107. In an example, hash values are linked between a pre-optimization IR of a function and hash values corresponding to one or more post-optimizations IRs of the function. In another embodiment, unused elements of hash data 220 can be archived within storage 125 of device 120. Alternatively, if a function associated with the software application is deleted to identified as obsolete, then the corresponding hash values may be purged (e.g., deleted). In an embodiment, hash data 220 can include hash values imported from another system (not shown) that was also utilized to compile the software application.

In one embodiment, storage 105 includes source code 106, intermediate representation (IR) library 107, and compiled code 109. Storage 105 may also include a plurality of information utilized by or generated by compiling environment program 300 optimization and analysis subroutine 400, and/or compiler 110, such a set of rules (e.g., logic) indicating if and when to apply an optimization routine to a specific IR of a function, a duration constraint that aborts the execution of an applied optimization routine and/or a duration constraint that directs a final phase (e.g., generation of an executable file or object) of a compile of the software application based on the available IRs of functions, while other optimization routines continue to execute in the background and additional information (e.g., effective status values, execution durations, etc.) is obtained for future compiling iterations.

In an embodiment, source code 106 includes a plurality of files and/or libraries associated with one or more versions of one or more software applications. In some embodiments, files and/or libraries within source code 106 are uploaded from device 120 to server 102. In other embodiments, files and/or libraries within source code 106 are developed and/or coded within server 102, such as by a user utilizing an IDE hosted by server 102.

In an embodiment, IR library 107 includes a plurality of IRs of functions respectively associated with a version of a software application, a compile iteration, and/or one or more optimization routines executed while compiling the software application. In some embodiments, IR library 107 includes initial (e.g., generated, original) IRs of functions and IRs of functions after optimization in response to a determination of an effective optimization. In other embodiments, IRs of functions stored within IR library 107 can be retrieved for use in a subsequent compile of the software application in response to determining that a function or the optimized IR of the function did not change between compile iterations. In various embodiments, one or more IRs of functions of the software application are archived (e.g., stored) or downloaded to another location, such as storage 125 of device 120.

Compiled code 109 includes the one or more executable files and/or objects generated during each compile iteration of the software application. Compiled code 109 may also include the executable files or objects corresponding to other software applications (not shown). In an embodiment, a user of device 120 can utilize UI 122 to purge or download executable files or objects associated with a software application from compiled code 109.

Compiling environment program 300 is a program for reducing a compile duration associated with a software application by controlling various aspects of a compiler. In one embodiment, compiling environment program 300 includes compiler 110, optimization table 200, and optimization and analysis subroutine 400. In various embodiments, compiling environment program 300 and optimization and analysis subroutine 400 control various actions of compiler 110 during subsequent executions of compiler 110, such as skipping (e.g., not executing) optimization routines flagged as ineffective for a given an IR of a function/optimization routine combination; thereby reducing the compiling time of the software application. Subsequently, compiling environment program 300 identifies a set of optimized and/or not optimized IRs of functions to compiler 110 for conversion to an executable version of the software application.

In an embodiment, compiling environment program 300 is associated with an IDE for developing software applications and aggregates data associated with a software application based on user inputs that are stored within application information 103. In some embodiments, each instance (e.g., version) of compiling environment program 300 integrates and controls an instance of optimization and analysis subroutine 400 and a specific version of compiler 110. In one scenario, compiling environment program 300 includes an instance of optimization table 200 corresponding to a version of compiler 110. In another scenario, compiling environment program 300 retrieves an instance of optimization table 200 corresponding to a version of compiler 110 from among one or more instances of optimization table 200 within storage 105. In other embodiments, compiling environment program 300 dynamically calls or swaps out versions of compiler 110 and a corresponding instance of optimization table 200 based on the dictates of a user developing a software application.

In a further embodiment, compiling environment program 300 and optimization and analysis subroutine 400 store IRs of functions, either optimized or not optimized, within IR library 107 and corresponding hash values within hash data 220 for a compiling iteration. Compiling environment program 300 can retrieve stored IRs of functions that did not change during previous compiling iterations of the software application and control various aspects of compiler 110 to utilize the retrieved IRs of functions and to prevent compiler 110 from generating IRs of functions that are retrieved.

Compiler 110 is representative of a software compiler installed on server 102. Compiler 110 utilizes a plurality of inputs, such as optimization level that indicates a set of optimization routines to apply while to converting source code into executable files or objects (discussed in further detail with respect to optimization table 200 and FIG. 2a) and constraints associated with a system executing the software application. In some embodiments, server 102 includes a plurality of instances (e.g., versions) of compiler 110. In an example, a version of compiler 110 may be respectively associated with a source code language, an operating system (OS) that runs the executable machine code (e.g., binary files) generated by the version of compiler 110, an IDE for developing a software application, a computing environment that hosts the software application, or a combination thereof. In other embodiments, each version of compiler 110 is integrated within a different instance of compiling environment program 300.

In various embodiments, compiler 110 executes two or more stages, phases, or passes to process source code of the software application and to generate one or more executable files or objects of the software application. In an example, compiler 110 executes a first (e.g., initial) phase to parse the source code of a software application and generates a corresponding set of intermediate representations (IRs) of functions, a second (e.g., optimization) phase that applies a set of optimization routines related to an optimization level to each IR of the group of IRs, and a third (e.g., final) phase during which compiler 110 utilizes a selected group of IRs of functions to generate executable files or objects corresponding to the software application. In some scenarios, compiler 110 applies optimization routines in a parallel manner (e.g., each optimization routine independently processes an IR of a function) to the generated set of IRs of functions of the software application. In other scenarios, compiler 110 applies optimization routines sequentially (e.g., the next optimization routine cannot execute until the prior optimization routine completes processing an IR of a function) to the generated set of IRs of functions of the software application. In an example, and based on FIG. 2a, compiler 110 executes optimization routine OR1 prior to OR3 executing for optimization level=2.

Optimization table 200 is a table that includes information corresponding to a plurality of optimization routines of compiler 110 and indications associating optimization routines and one or more corresponding optimization levels (described in further detail with respect to FIG. 2a) of compiler 110 that invoke an optimization routine. In some embodiments, each version of compiler 110 is associated with a corresponding instance (e.g., version) of optimization table 200. In an example, a version of compiler 110 of one vendor may include a set of optimization routines and/or optimization levels different from the optimization routines and/or optimization levels of compiler 110 from another vendor. Similarly, an enterprise-level version of compiler 110 may include more optimization routines than a professional-level version of compiler 110, therefore the corresponding instances of optimization table 200 can differ.

In various embodiments, an instance of optimization table 200 is linked to a corresponding version of compiler 110. In response to a user dictating (e.g., specifying) a version of compiler 110 to utilize by compiling environment program 300, the corresponding instance of optimization table 200 is loaded by or linked to compiling environment program 300. In an embodiment, information within an instance of optimization table 200 is utilized to generate and populate information within one or more instances of table 211 (discussed in further detail with respect to FIG. 2b) within tables 210 corresponding to a software application.

In an embodiment, device 120 is representative of a computing device of one or more users (e.g., software coders/developers). In an embodiment, device 120 includes user interface (UI) 122 and storage 125. Device 120 may also include programs and data, such as an IDE, a coding environment, a web browser, an editor/programming tool, documentation related to developing a software application (e.g., user requirements, system dependencies, etc.). Storage 125 includes information associated with one or more software application to compile on server 102. In an embodiment, storage 125 is utilized to archive information associated with or generated during a compile of a software application, such as instance of hash data 220, one or more tables (e.g., table 211) of table 210, and various IRs of functions from IR library 107.

In one embodiment, UI 122 may be a graphical user interface (GUI) or a web user interface (WUI), and UI 122 can display text, documents, forms, web browser windows, user options, application interfaces, and instructions for operation, and include the information, such as graphic, text, and sound that a program presents to a user. In various embodiments, UI 122 displays one or more icons representing applications that a user can execute via network 130, such as a client interface for compiling environment program 300 and/or an IDE (not shown), and various programs (not shown) of server 102 and/or other computing systems (not shown) accessible via network 130. In addition, UI 122 can control sequences of actions that the user utilizes to respond and/or confirm actions associated with developing (e.g., coding) a software application, uploading/downloading source code and/or compiled code to and from server 102 for the software application associated with user of device 120.

In some embodiments, a user of device 120 can interact with UI 122 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 122 operating within the GUI environment of device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 122 may receive input in response to a user of device 120 utilizing natural language, such as written words or spoken words, that device 120 identifies as information and/or commands.

In one embodiment, server 102 and device 120 communicate through network 130. Network 130 can be, for example, a local area network (LAN), a telecommunications network, a wireless local area network (WLAN), a wide area network (WAN), such as the Internet, or any combination of the previous, and can include wired, wireless, or fiber optic connections. In general, network 130 can be any combination of connections and protocols that will support communications between server 102 and device 120, in accordance with embodiments of the present invention. In some embodiments, network 130 operates locally via wired, wireless, or optical connections and can be any combination of connections and protocols (e.g., near field communication (NFC), laser, infrared, etc.). In another embodiment, network 130 enables server 102 to communicate with another computing system (not shown) to obtain additional programs, such as a different version of compiler 110, and/or information related to the capabilities of a version of compiler 110, such as optimization routines of the version of compiler 110 and parameters associated with affecting aspects of compiler 110.

FIG. 2a is an illustrative example of an instance of optimization table 200, a table of respective optimization routine identifiers and corresponding optimization levels that invoke one or more optimization routines corresponding to an instance (e.g., version) of compiler 110, in accordance with embodiments of the present invention. In the depicted example, row 201 of table 200 indicates that the corresponding version of compiler 110 includes twelve optimization routines identified as (OR-ID): OR1, OR2, OR3, OR4A, OR4B, OR4C, OR5, OR6, OR7, OR8, OR9, and OR10. In an embodiment, an order related to the optimization routines within row 201 indicates an execution sequence associated with the optimization routines. In an example, during a level 2 optimization, OR1 is the leading optimization routine with respect to OR7 (e.g., a trailing optimization routine). Row 202 identifies the one or more optimization levels (e.g., 1-5) that invoke respective OR-IDs identified within row 201. In an illustrative example, column 203 of depicted table 200 indicates that OR1 is invoked by optimization levels 1, 2, 3, 4, and 5.

In some embodiments, the optimization routines corresponding to a version of compiler 110 have an efficiency hierarchy. In an example, compiler 110 is utilizing an optimization level=2; therefore, OR1, OR3, OR4B, OR5, OR6, and OR7 are executed. In response to OR1, OR4B, and OR7 modifying an IR of a function, the optimized IR for the function corresponding to OR7 is potentially more efficient than the optimized IR of the function based on OR1 or OR4B. However, if the hash value corresponding to the IR of the function modified by OR7 is the same as the hash value corresponding to the IR of the function modified by OR4B, then OR7 is no more efficient than OR4B for optimizing the IR of the function.

FIG. 2b is an illustrative example of an instance of table 211 that is associated with controlling whether an optimization routine is applied to a respective function while compiling a software application, in accordance with embodiments of the present invention. In an embodiment, indicators associated with an instance of table 211 include information that indicates an optimization level associated with the information included within the instance of table 211 and a compiling iteration (e.g., pass, version, etc.) indicator associated with the software application. In the illustrative example, element 212 associated with the depicted instance of table 211 includes two indicators. A first indicator, "L" corresponds to the optimization level associated with a table and a second indicator, "M" indicates the compiling iteration associated with a software application.

Figure 3:
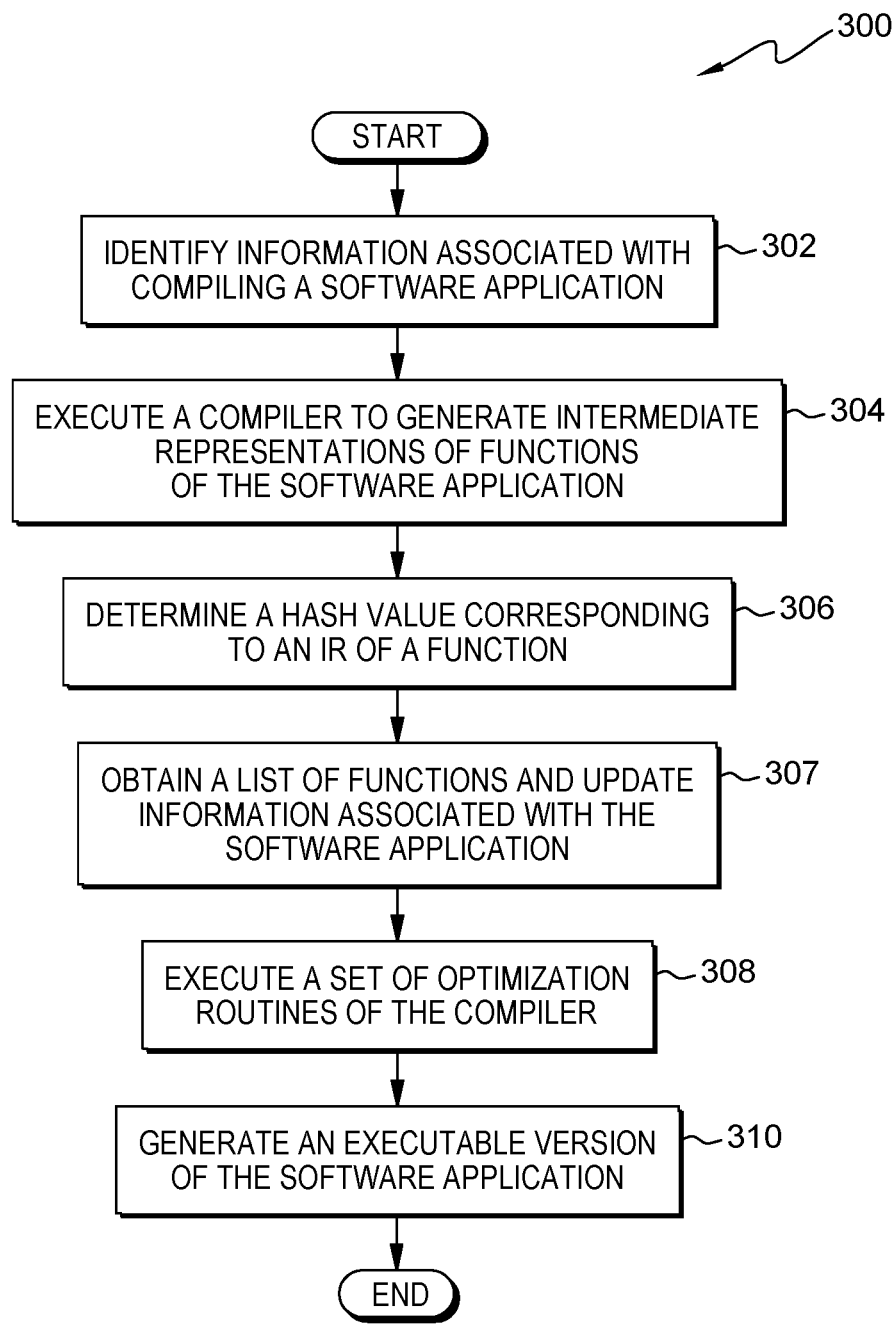
FIG. 3 depicts a flowchart of operational steps of a compiling environment program, in accordance with an embodiment of the present invention.

In an embodiment, a size (e.g., number of rows and columns) of an instance of table 211 is based on the information associated with an instance of table 200 corresponding to a version of compiler 110 and a value for the plurality of functions generated during a first phase of compiling a software application (discussed in further detail with respect to FIG. 3, step 304). In addition, the number of optimization levels associated with a version of compiler 110 dictate the number of instances of table 211 associated with compiling the software application. In an example, the depicted instance of table 211 is associated with an optimization level of L=2. In an embodiment and based on the depicted instance of optimization table 200 in FIG. 2a, five instances of table 211 are generated for each compiling iteration of the software application. In some embodiments, an instance of table 211 is illustrative of one of "n" pages of a 3-D array where each page of the array corresponds to a different optimization level for a version of compiler 110 and includes information associated with compiling a software application. In an example and based on table 200 of FIG. 2a, the depicted instance of table 211 depicts the second page (e.g., optimization level L=2) of a five-page 3-D array.

In the illustrative example, row 213 of table 211 depicts the optimization routine identifiers (OR-IDs) corresponding to row 201 of the depicted instance of optimization table 200 of FIG. 2a. Column 214 of the depicted instance of table 211 lists the functions generated during a first compiling phase of the software application (discussed in further detail with respect to FIG. 3, step 307). In the illustrative example, the plurality of functions generated during a first compiling phase of the software application are identified by function numbers (F-#). In the illustrative example, information within an instance of row 215 corresponds to a F-# within column 214. In some embodiments, the list of functions within an instance of table 211 is based on other identifiers generated by compiler 110, such as a function name or serial number.

In an embodiment, the depicted row 215 includes a number of instances of cell 216 equivalent to the number of optimization routines identified within the depicted instance of table 200 of FIG. 2a. In addition, an instance of cell 216 includes information related to a F-# and a respective optimization routine (i.e., an OR-ID). In one embodiment, an instance of cell 216, such as cell 216A includes a first and a second element of information as respectively depicted within callout 217A ($O_S$) and callout 217B ($E_P$). The first element of information, an optimization routine status ($O_S$) indicates whether a OR-ID is active (e.g., potentially applied) during an optimization phase of compiler 110 for a corresponding optimization level. In an embodiment, $O_S=1$ indicates that a respective optimization routine is applied (e.g., activated or executed) to the IRs of functions during an optimization phase, and $O_S=0$ indicates that a respective optimization routine is not executed to the IRs of functions during an optimization phase. In the example where optimization level=2, $O_S=1$ for optimization routines OR1, OR3, OR4B, OR5, OR6, and OR7; and $O_S=0$ for OR2, OR4A, OR4C, OR8, OR9, and OR10.

Figure 4:
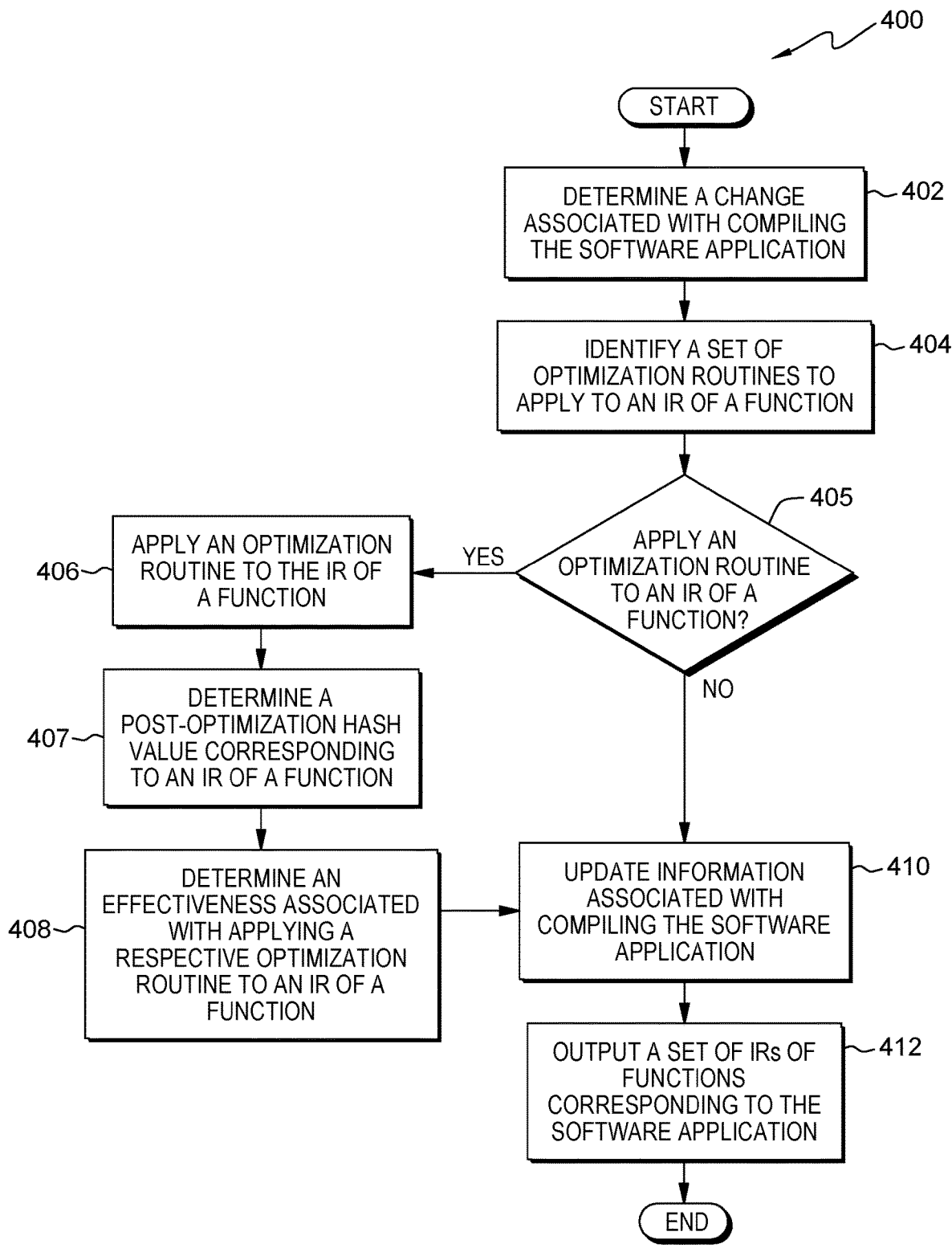
FIG. 4 depicts a flowchart of operational steps of an optimization and analysis subroutine, in accordance with an embodiment of the present invention.

Still referring to cell 216A, the second element of information, an effectiveness status associated with a prior compile ($E_P$) indicates whether during compile iteration M−1 that an optimization routine was effective for a given function during the optimization phase of compiler 110 for the software application (discussed in further detail with respect to FIG. 4, step 408). In an embodiment, if $E_P=1$, then a respective optimization routine was effective for an IR of a function; if $E_P=0$, then the respective optimization routine was not effective for the IR of the function; and if $E_P=U$, then the effectiveness for the optimization routine and a respective IR of the function is unknown. For example, and based on table 200 of FIG. 2a, if prior executions of compiler 110 invoked only optimization levels 1, 2, and/or 3, then $E_P=U$ for the functions listed within column 214 for instances of cell 216 respectively associated with OR-IDs: OR8, OR9, and OR10.

FIG. 2c is an illustrative depiction of another set of information for inclusion within an instance of table 211 associated with compiling a software application, in accordance with an embodiment of the present invention. In some embodiments, additional information associated with compiling a software application is aggregated for inclusion within an instance of table 211 corresponding to an optimization level, a corresponding version of compiler 110, and a corresponding instance of optimization table 200. In an embodiment, the other set of information within each instance of cell 216 included within an instance of table 211 includes: an optimization routine status ($O_S$), a function change ($\Delta F$) indication, a prior effectiveness ($E_P$) status, and current effectiveness ($E_C$) status (as depicted in element 218).

In one scenario, with respect to depicted element 218, $O_S$ corresponds to the information stored in a first position of an instance of cell 216. $\Delta F=1$ signifies that the code or IR of a function (F-#) in the current compile iteration (M) differs from the same function of the previous compile iteration (M−1). Alternatively, $\Delta F=0$ signifies that the code corresponding to F-# is the same between compile iterations M and M−1. In addition, the value corresponding to each instance of $E_P$ and $E_C$ signifies the same effectiveness status as described above with respect to FIG. 2b. In an embodiment, the value corresponding to an instance of $E_P$ within an instance of table $211_{L,M}$ is updated to an indication corresponding to a determined effectiveness status ($E_C$) within a corresponding subsequent instance of table $211_{L,M+1}$ (discussed in further detail with respect to FIG. 4, step 408 and step 410).

FIG. 3 is a flowchart depicting operational steps for compiling environment program 300, a program for reducing the compile duration associated with a software application, in accordance with embodiments of the present invention. In one embodiment, compiling environment program 300 interfaces with optimization and analysis subroutine 400 to determine whether one or more optimization routines of compiler 110 are effective for optimizing an IR of a function associated with the software application. In another embodiment, in response to compiling another iteration of a software application, compiling environment program 300 utilizes optimization and analysis subroutine 400 to control compiler 110 to selectively execute one or more optimization routines associated with an optimization level based, at least in part, on an effectiveness status corresponding to an optimization routine and a respective IR of a function related to the software application.

In step 302, compiling environment program 300 identifies information associated with compiling a software application. In one embodiment, compiling environment program 300 identifies information associated with compiling a software application within application information 103, such as files and/or libraries within source code 106 associated with the software application, a version of compiler 110 utilized to compile the software application, one or more optimization levels to invoke while compiling the software application, one or more user preferences and/or constraints, one or more parameters utilized by compiler 110 to compile the software application, a location for storing the executable form of the software application, etc.

In some embodiments, compiling environment program 300 identifies other information related to compiling a software application, such as an instance of optimization table 200 corresponding to the utilized version of compiler 110, a hash algorithm for determining hash values for IRs of functions, information indicating that the software application was previously compiled, etc. In another embodiment, if compiling environment program 300 cannot find an instance of optimization table 200 corresponding to the version of compiler 110, then compiling environment program 300 queries compiler 110 and/or other sources (not shown) to obtain information related to optimization routines and optimization levels of the version of compiler 110 to generate the corresponding instance of optimization table 200.

Still referring to step 302 in some embodiments, if compiling environment program 300 determines that the software application was previously compiled, then compiling environment program 300 identifies other items related compiling the software application. In an example, compiling environment program 300 may identify other items related to one or more previous compiles of the software application, such as various tables within tables 210 utilized by or updates during a previous compile, hash values corresponding to the IRs of functions within hash data 220 (original IRs and optimized IRs), a list of IRs of functions (original IRs and optimized IRs) stored within IR library 107, changes related to one or more files or libraries within source code 106, documentation stored within application information 103, etc.

In step 304, compiling environment program 300 executes a compiler to generate intermediated representations of functions of the software application. In an embodiment, compiling environment program 300 instructs compiler 110 (e.g., the dictated version) to initiate the compiling of one or more source code files/libraries related to the software application within source code 106. In response, the compiler 110 generates a plurality of IRs of functions associated with the software application. In some embodiments, compiling environment program 300 stores the plurality of generated IRs of functions within IR library 107.

In a further embodiment, compiling environment program 300 determines whether one or more portions (e.g., files) of the source code of the software application within source code 106 were not modified since the previous compile of the software application. If compiling environment program 300 determines that one or more IRs of functions corresponding to the unmodified portion of source code are stored within IR library 107, then compiling environment program 300 instructs compiler 110 to not generate IRs of functions for the unmodified portion of the source code of the software application.

In step 306, compiling environment program 300 determines a hash value corresponding to an IR of a function. Compiling environment program 300 determines a hash value (e.g., a pre-optimization hash value) corresponding to an IR of a function before compiler 110 applies one or more optimization routines to the IR of the function. In some embodiments, compiling environment program 300 utilizes a message-digest-5 (MD5) algorithm to generate a hash value corresponding to each IR of a function generated by compiler 110. In other embodiments, compiling environment program 300 utilizes hash algorithm (e.g., function)

dictated by a user within application information 103 to generate a hash value corresponding to each IR of a function generated by compiler 110. In various embodiment, compiling environment program 300 stores the determined hash value corresponding to the IR of each function within hash data 220 associated with the software application.

In step 307, compiling environment program 300 obtains a list of functions and updates information associated with the software application. In an embodiment, compiling environment program 300 obtains a list of functions (e.g., IRs of functions) generated by compiler 110 (step 304). In another embodiment, compiling environment program 300 utilizes the obtained list of functions and an instance of optimization table 200 to update information associated with the software application by generating a set of tables 211 that are associated with the software application (previously discusses with respect to FIG. 2b).

In some embodiments, compiling environment program 300 generates one or more other tables, associative arrays, or other data structures that cross-references the list of IRs of functions, function identifiers (e.g., F-#) corresponding to the IRs of functions, a set of pre-optimization hash values corresponding to the list of functions or function identifiers etc. In various embodiments, compiling environment program 300 updates information related to a prior compile of the software application with information associated with the current compile of the software application, such as updating one or more instances of table 211 within tables 210 indicating a change to the optimization level and respective optimization routines to be applied to IRs of functions, updating pre-optimization hash values corresponding to IRs of functions, etc.

Still referring to step 307 in other embodiments, compiling environment program 300 determines whether a one or more changes associated with the software application have occurred since the previous compile iteration of the software application. In one example, compiling environment program 300 determines that a change associated with the software application between compile iterations based on identifying one or more additions and/or deletions of functions between the lists of functions corresponding to compile iterations M and M−1 for the software application. In another example, compiling environment program 300 determines that an IR of a function changed between compile iterations based on comparing the pre-optimization hash values corresponding to an IR of a function for compile iteration M to a corresponding IR of the function for compile iteration M−1 for the software application. Compiling environment program 300 utilizes the determined changes to add or modify an instance table 211 associated with the current compile iteration of the software application, such as updating a change status (e.g., (a ΔF value)) corresponding to an IR of a function.

In step 308, compiling environment program 300 executes a set of optimization routines of the compiler. In an embodiment, compiling environment program 300 interfaces with optimization and analysis subroutine 400 to instruct execute compiler 110 to execute (e.g., apply) a set of optimization routines of among the set of IRs of functions generated in step 304. Compiling environment program 300 may indicate to optimization and analysis subroutine 400 the one or more tables of tables 210 and/or rules within storage 105 to utilize for instructing compiler 110 to selectively optimize the IRs of functions of the software application. In response, compiling environment program 300 receives information from optimization and analysis subroutine 400 related to a set of IRs of functions (optimized and unoptimized) of the software application utilized to generate an executable version of the software application.

In step 310, compiling environment program 300 generates an executable version of the software application. In an embodiment, compiling environment program 300 instructs compiler 110 to execute a final compiling phase that generates an executable version of the software application. Compiling environment program 300 dictates a group IRs of functions of the output set of IRs of functions (discussed in further detail with respect to FIG. 4, step 412) that compiler 110 utilizes to generate the executable version of the software application. In some embodiments, compiling environment program 300 stores the executable version of the software application in compiled code 109. In other embodiments, compiling environment program 300 transmits the executable version of the software application to another system for testing and/or review, such as device 120. In various embodiments, compiling environment program 300 updates application information 103 to include additional information associated with compiling the software application, such as a total compile duration, and the group of IRs of functions utilized to generate the executable version of the software application.

FIG. 4 is a flowchart depicting operational steps for optimization and analysis subroutine 400, a subroutine that instructs a software compiler to selectively apply (e.g., execute) optimization routines to IRs of functions associated with a software application, in accordance with embodiments of the present invention. In addition, optimization and analysis subroutine 400 determines whether an optimization routine of a compiler is effective in optimizing an IR of a function associated with the software application being compiled. In various embodiments, optimization and analysis subroutine 400 interfaces with compiling environment program 300 and controls various aspects of compiler 110 while compiling the software application. In some embodiments, various aspects (e.g., steps) of optimization and analysis subroutine 400 can execute independently for each IR of a function/optimization routine combination.

In step 402, optimization and analysis subroutine 400 determines a change associated with compiling the software application. In one embodiment, optimization and analysis subroutine 400 determines one or more changes associated with compiling the software application based on updates within information within application information 103. A change associated with compiling the software application may include identifying one or more optimization levels to invoke, a dictate associated with executing optimization routines of an unknown effectiveness status ($E_F$=U); one or more user preferences and/or dictates; one or more criteria associated with storing, replacing, and/or archiving IRs of functions (e.g., post-optimization and/or pre-optimization) within IR library 107, etc. In another embodiment, optimization and analysis subroutine 400 determines that a change associated with compiling the software application occurs based on information within one or more instances of table 211.

In some embodiments, in response to determining that the software application was previously compiled, optimization and analysis subroutine 400 determines whether a change has occurred to one or more functions of the software application, such as identifying a change associated with the pre-optimization hash values between the prior compile iteration (e.g., M−1) of the software application and the current compile iteration (e.g., M) of the software application, or an indication within application information 103. In other embodiments, optimization and analysis subroutine 400 identifies a change associated with one or more functions of the software application based on comparing the post-optimization hash value corresponding to an IR of a function for the prior compile iteration (e.g., M−1) of the software application and the respective pre-optimization hash value corresponding to an IR of a function associated with the current compile iteration (e.g., M) of the software application.

In step 404, optimization and analysis subroutine 400 determines a set of optimization routines to apply to an IR of a function. In one embodiment, optimization and analysis subroutine 400 determines a set of optimization routines to apply to among the IRs of functions generated by compiler 110 (previously discussed with respect to FIG. 3, step 304) in response to compiling the software application. In another embodiment, optimization and analysis subroutine 400 determines a set of optimization routines to apply to among the IRs of functions based on the instance of table 211, such as including the IR of a function/optimization routine combinations where $E_P=1$. In some embodiments, optimization and analysis subroutine 400 utilizes one or more rules within storage 105 and/or user preferences/dictates within application information 103 that affects determining the set of optimization routines to apply to among the IRs of functions, such as an optimization duration constraint, a compile efficiency preference, a response to an effectiveness status of unknown (e.g., $E_P=U$), etc.

In various embodiments, optimization and analysis subroutine 400 determines not to optimize an IR of a function with an optimization routine (e.g., IR of a function/optimization routine combination) in response to determining that a status corresponding to an IR of a function/optimization routine combination as ineffective (e.g., $E_P=0$), for a function within the list of functions, utilizing one or more rules include in storage 105 in addition to one or more instance of tables 211. In an example, if optimization and analysis subroutine 400 determines that a compile speed preference is indicated, the invoked optimization level is different from optimization levels of one or more previous compiles, and $E_P=U$ for one or more optimization routines of the invoked optimization level, then optimization and analysis subroutine 400 may limit the number of optimization routines with $E_P=U$ applied to the list of IRs of functions. In an example (with respect to table 211 of FIG. 2b), if optimization and analysis subroutine 400 determines that the optimization level=4 for the current compile iteration, $E_P=U$ for OR8 and OR9; then optimization and analysis subroutine 400 may indicate that OR8 is applied the list of functions and that OR9 is excluded from execution during the current compile iteration.

Still referring to step 404 in other embodiments, optimization and analysis subroutine 400 determines that an IR of a function did not change between compile iterations and that one or more optimized IRs of the function are stored within IR library 107. Based on the linkage among a pre-optimization hash value corresponding to a function and the corresponding post-optimization hash values of optimized functions and respective optimization levels, optimization and analysis subroutine 400 identifies a post-optimization IRs of the function for retrieval from IR library 107. In response, optimization and analysis subroutine 400 excludes the optimized IR of the function from optimizing by compiler 110. However, if the optimization level of the current compile of the software application invokes one or more optimization routines with an $E_P=U$, then optimization and analysis subroutine 400 includes the IR of the function for optimization by the one or more optimization routines with an $E_P=U$. In a further embodiment, optimization and analysis subroutine 400 determines whether to apply an optimization routine to the IR of a function based on an optimization duration constraint. In an example, optimization and analysis subroutine 400 identifies an optimization duration and excludes one or more IR of a function/optimization routine combinations that exceed the optimization constraint.

In decision step 405, optimization and analysis subroutine 400 determines whether to apply an optimization routine to an IR of a function. In one embodiment, optimization and analysis subroutine 400 determines whether to apply an optimization routine to an IR of a function based on the determined set of optimization routines to apply to an IR of a function (step 404). In another embodiment, in response to optimization and analysis subroutine 400 determining the current compile of the software application is the initial compile of the software application, optimization and analysis subroutine 400 applies each optimization routine of compiler 110 for each optimization level among the IRs of functions for the software application. In some embodiments, optimization and analysis subroutine 400 does not apply (e.g., skips) an optimization routine to an IR of a function based on a status of $E_P=0$ an IR of a function/optimization routine combination. In other embodiments, optimization and analysis subroutine 400 does not apply (e.g., skips) a set optimization routine to an IR of a function based retrieving an optimized IR of a function from IR library 107.

Responsive to determining to apply an optimization routine to an IR of a function (Yes branch, decision step 405), optimization and analysis subroutine 400 applies an optimization routine to the IR of a function (step 406).

In step 406, optimization and analysis subroutine 400 applies an optimization routine to the IR of a function. In one embodiment, optimization and analysis subroutine 400 instructs compiler 110 to apply a set of optimization routines to the generated IRs of functions of the software application (in FIG. 3, step 304) based on a default response to an initial compile of the software application. In some embodiments, optimization and analysis subroutine 400 also determines a duration to optimize an IR of a function for each IR of a function/optimization routine combination. Optimization and analysis subroutine 400 stores the determined durations to optimize an IR of a function within another table (not shown) of tables 210.

In another embodiment, if optimization and analysis subroutine 400 determines that an optimization level is invoked different from the optimization levels previously invoked for compiling the software application, then optimization and analysis subroutine 400 instructs compiler 110 to apply each optimization routine of the different optimization level that is invoked among the generated IRs of functions associated with the software application. In various embodiments, optimization and analysis subroutine 400 instructs compiler 110 to selectively apply (e.g., execute) the set of the optimization routines among a generated IRs of functions of the software application based on effectiveness status indication of $E_P=1$ within one or more instances of table 211 associated with the software application.

Still referring to step 406, in a further embodiment, optimization and analysis subroutine 400 determines whether to terminate the execution of an optimization routine to an IR of a function based on an optimization duration constraint. In an example, optimization and analysis subroutine 400 identifies an optimization duration constraint from application information 103. If while compiler 110 is executing one or more optimization routines on an IR of a function, optimization and analysis subroutine 400 determines that an optimization routine exceeds the optimization duration constraint, then optimization and analysis subroutine 400 can instruct compiler 110 to terminate the corresponding optimization routine for an IR of the function. In some scenarios, optimization and analysis subroutine 400 instruct compiler 110 to terminate the optimization routine that exceeds the optimization duration constraint for the IR of the function. In other scenarios, optimization and analysis subroutine 400 continues to step 407 while allowing compiler 110 to complete executing the optimization routine that exceeds the optimization duration constraint for the IR of the function. Optimization and analysis subroutine 400 determines an optimization duration respective associated with each IR of a function/optimization routine combination that exceeded the optimization duration constraint.

In step 407, optimization and analysis subroutine 400 determines a post-optimization hash value corresponding to an IR of a function. In one embodiment, optimization and analysis subroutine 400 determines a hash value corresponding to an IR of a function after applying an optimization routine (e.g., post-optimization) utilizing a hash algorithm, such as MD5. In another embodiment, optimization and analysis subroutine 400 determines a post-optimization hash value corresponding to an IR of a function based on utilizing a hash algorithm dictated by a user within application information 103.

In some embodiments, if compiler 110 applies two or more optimization routines of an optimization level to an IR of a function, either sequentially or in parallel, then optimization and analysis subroutine 400 determines a post-optimization hash values corresponding to an IR of a function respective associated with each optimization routine. In other embodiments, optimization and analysis subroutine 400 also determines a post-optimization hash value corresponding to an IR of a function for each IR of a function/optimization routine combination that was not terminated and that exceeded the optimization duration constraint.

In step 408, optimization and analysis subroutine 400 determines an effectiveness associated with applying a respective optimization routine to an IR of a function. In one embodiment, optimization and analysis subroutine 400 determines that an IR of a function/optimization routine combination is effective based on determining that the post-optimization hash value corresponding to an IR of a function (determine in step 407) differs from the pre-optimization hash value corresponding to the generated IR of the function (previously discussed with respect to FIG. 3, step 306). In some scenarios, optimization and analysis subroutine 400 caches the effectiveness indication for an IR of a function/optimization routine combination to subsequently update information associated with the software application (step 410). In another embodiment, if optimization and analysis subroutine 400 determines that an IR of an unchanged function was retrieved from IR library 107, then optimization and analysis subroutine 400 determines that applying a respective optimization routine to an IR of a function is effective based on determining that the post-optimization hash value associated with the IR for a function for respective optimization routine differs from a hash value within hash data 220 that corresponds to the retrieved IR of the function.

In some embodiments, if two or more optimization routines of the same optimization level are applied to an IR of a function, then optimization and analysis subroutine 400 determines that an optimization routine is effective for an IR of a function based on determining whether the respective post-optimization hash values associated with the two or more optimization routines differs from the pre-optimization hash value corresponding to the IR of the same function. In addition, optimization and analysis subroutine 400 may further determine whether a respective post-optimization hash value for one optimization routine differs from the post-optimization hash value corresponding to another optimization routine for the IR of the same function.

In an example (discussed with respect to FIG. 2b, table 211), if optimization and analysis subroutine 400 determines that the post-optimization hash values for an IR of F-1 associated with OR1, OR4B, and OR7 differ from the pre-optimization hash value of the generated IR of F-1, then each of OR1, OR4B, and OR7 are candidates for a status of "effective". However, if optimization and analysis subroutine 400 determines that the post-optimization hash values corresponding to OR4B and OR7 are the same but differ from the post-optimization hash value corresponding to OR1, then optimization and analysis subroutine 400 assigns a status of effective (e.g., $E_C=1$) for optimization routines OR1 and OR4B and a status of ineffective (e.g., $E_C=0$) for optimization routine OR7 with respect to the generated IR of the function.

Still referring to step 408, in other embodiments, if optimization and analysis subroutine 400 determines that two or more optimization routines of the current optimization level produce unique post-optimization hash values for an IR of a function that differ from the pre-optimization hash value corresponding to the IR of the same function, then optimization and analysis subroutine 400 determines a respective effectiveness status for each optimization routine based on an efficiency hierarchy associated with the executed optimization routines. In an example (discussed with respect to FIG. 2b, table 211), if optimization and analysis subroutine 400 determines that the post-optimization hash values corresponding to an IR of F-1 are unique among OR1, OR4B, and OR7 and differ from the pre-optimization hash value of the IR of F-1, then optimization and analysis subroutine 400 assigns a status of effective (e.g., $E_C=1$) for OR7, and a status of ineffective (e.g., $E_C=0$) for OR1 and OR4B.

Referring to decision step 405, responsive to determining not to apply an optimization routine to an IR of a function (No branch, decision step 405), optimization and analysis subroutine 400 updates information associated with compiling the software application (step 410).

In step 410, optimization and analysis subroutine 400 updates information associated with compiling the software application. In an embodiment, optimization and analysis subroutine 400 updates one or more instances of table 211 associated with the software application that include a plurality IR of a function/optimization routine combinations, such as assigning an effectiveness status information determined at step 408 and whether one or more functions changed between compile iteration of the software application. In another embodiment, optimization and analysis subroutine 400 updates post-optimization hash value information within hash data 220. In some embodiments, optimization and analysis subroutine 400 updates other information associated with the software application, such as optimization durations corresponding to IR of a function/optimization routine combinations, creating or modifying instances of table 211 based on utilizing a new optimization level, etc.

In step 412, optimization and analysis subroutine 400 outputs a set of IRs of functions corresponding to the software application to compile. In one embodiment, optimization and analysis subroutine 400 outputs a set of IRs of functions selected from among optimized IRs of functions associated with an $E_C=1$ and one or more IRs of functions that were not identified for optimization during the current compile iteration of the software application. In some embodiments, optimization and analysis subroutine 400 retrieves an optimized IR corresponding to one or more functions from IR library 107 based on information associated with a previous compile of the software application (in step 402 and step 404). In various embodiments, optimization and analysis subroutine 400 communicates with compiling environment program 300 indicating a set of IRs of functions (e.g., post-optimization and/or pre-optimization IRs) that are utilized to generate an executable form of the software application.

In another embodiment, optimization and analysis subroutine 400 stores a plurality of IRs of functions (e.g., post-optimization and/or pre-optimization IRs) within IR library 107 based on one or more criteria. Optimization and analysis subroutine 400 may also replace, delete, and/or archive one or more IRs of functions (e.g., post-optimization and/or pre-optimization IRs) corresponding to a function that changed between compile iterations of the software application based on other criteria. In an example, optimization and analysis subroutine 400 does not store or delete post-optimization IRs of functions within IR library 107 that are associated with an "ineffective" status.

Figure 5:
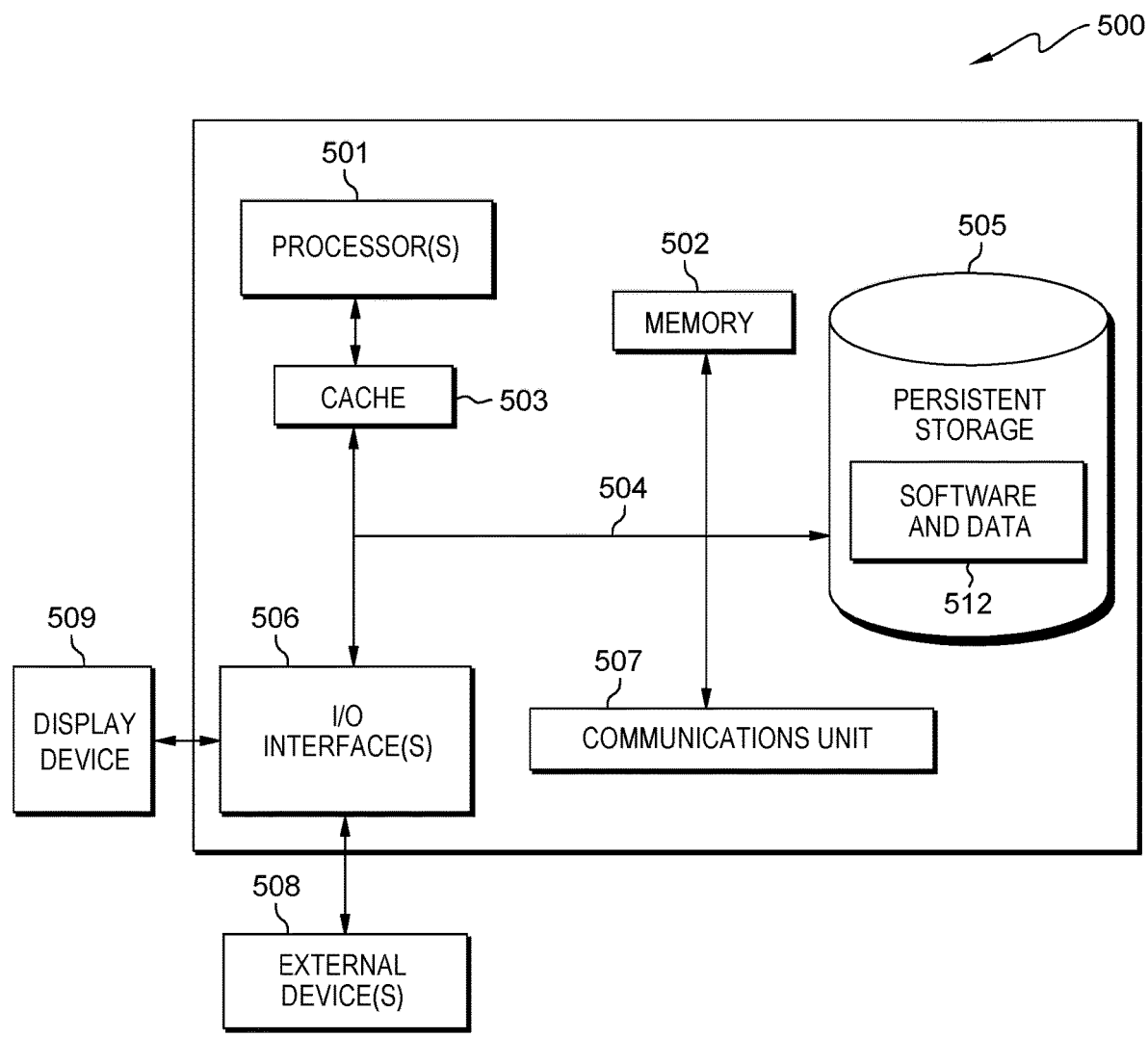
FIG. 5 is a block diagram of components of a computer, in accordance with an embodiment of the present invention.

FIG. 5 depicts computer system 500, which is representative of server 102 and device 120. Computer system 500 is an example of a system that includes software and data 512. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random-access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102 persistent storage 505 may also include storage 105, and with respect to device 120 persistent storage 505 may also include storage 125. With respect to server 102, software and data 512 includes compiler 110, compiling environment program 300, optimization and analysis subroutine 400, application information 103, source code 106, IR library 107, compiled code 109, tables 210, table 211, optimization table 200, and other programs and data (not shown). With respect to device 120, software and data 512 includes UI 122, and other data and programs (not shown).

Communications unit 507, in these examples, provides for communications with other data processing systems or devices, including resources of server 102 and device 120. In these examples, communications unit 507 includes one or more network interface cards. Communications unit 507 may provide communications, through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for controlling a compile of a software application, the method comprising:
generating, by one or more computer processors, from source code corresponding to a software application, a plurality of pre-optimization intermediate representations (IRs) of functions associated with the software application;

identifying, by one or more computer processors, an optimization level to invoke while compiling the software application, wherein the optimization level dictates a set of optimization routines respectively applied to a pre-optimization IR corresponding to a function associated with the software application;

generating, by one or more computer processors, a plurality of post-optimization IRs of the functions associated with the software application by executing the dictated set of optimization routines on the plurality of pre-optimization IRs of functions, wherein the plurality of generated post-optimization IRs includes a quantity of post-optimization IRs corresponding to the function is based on the dictated set of optimization routines associated with the identified optimization level;

determining, by one or more computer processors, a set of IRs of the functions, from among the plurality of generated pre-optimization IRs of the functions associated with the software application and the generated plurality of post-optimization IRs of the functions associated with the software application; and converting, by one or more computer processors, the determined set of IRs of functions to an executable version of the software application.

2. The method of claim 1, wherein generating the plurality of post-optimization IRs of the functions associated with the software application further comprises:

identifying, by one or more computer processors, information associated with a prior compile of the software application, wherein the information associated with the prior compile of the software application includes an effectiveness status corresponding to an optimization routine respectively associated with the pre-optimization IR of the function; and responsive to determining that the effectiveness status corresponding to the optimization routine respectively associated with the pre-optimization IR of the function is not effective, determining, by one or more computer processors, not to execute the optimization routine, dictated by the identified optimization level, on the pre-optimization IR of the function.

3. The method of claim 2, further comprising:

responsive to determining that the effectiveness status corresponding to the optimization routine respectively associated with the pre-optimization IR of the function is effective, executing, by one or more computer processors, the optimization routine, dictated by the identified optimization level on the pre-optimization IR of the function.

4. The method of claim 1, wherein generating the plurality of post-optimization IRs of the functions associated with the software application further comprises:

identifying, by one or more computer processors, a previous hash value corresponding to the pre-optimization IR of the function associated with a prior compile of the software application;

determining, by one or more computer processors, a pre-optimization hash value corresponding to the generated pre-optimization IR of the function; and responsive to determining that the pre-optimization hash value corresponding to the generated pre-optimization IR of the function differs from the previous hash value corresponding to the pre-optimization IR of the function associated with the prior compile of the software application, determining, by one or more computer processors, to execute the dictated set of optimization routines on the pre-optimization IR of the function.

5. The method of claim 1, further comprising:

determining, by one or more computer processors, a pre-optimization hash value corresponding to a pre-optimization IR of a function from the plurality of generated pre-optimization IRs of the functions associated with the software application;

determining, by one or more computer processors, a post-optimization hash value corresponding to a post-optimization IR of the function respectively associated with executing the dictated set of optimization routines on the pre-optimization IR of the function; and responsive to determining that the post-optimization hash value corresponding to the post-optimization IR of the function respectively associated with executing an optimization routine of the dictated set of optimization routines on the pre-optimization IR of the function differs from the pre-optimization hash value corresponding to the pre-optimization IR of the function, assigning, a status of effective for the optimization routine respectively associated with the pre-optimization IR of the function.

6. A computer program product for controlling a compile of a software application, the computer program product comprising:

one or more computer readable storage media and program instructions stored on the one or more computer readable storage media, the program instructions readable/executable by one or more computer processors:

program instructions to generate, from source code corresponding to a software application, a plurality of pre-optimization intermediate representations (IRs) of functions associated with the software application;

program instructions to identify an optimization level to invoke while compiling the software application, wherein the optimization level dictates a set of optimization routines respectively applied to a pre-optimization IR corresponding to a function associated with the software application;

program instructions to generate a plurality of post-optimization IRs of the functions associated with the software application by executing dictated set of optimization routines on the plurality of pre-optimization IRs of functions, wherein the plurality of generated post-optimization IRs includes a quantity of post-optimization IRs corresponding to the function is based on the dictated set of optimization routines associated with the identified optimization level;

program instructions to determine a set of IRs of the functions, from among the plurality of generated pre-optimization IRs of the functions associated with the software application and the generated plurality of post-optimization IRs of the functions associated with the software application; and program instructions to convert a determined set of IRs of functions to an executable version of the software application.

7. The computer program product of claim 6, wherein program instructions to generate the plurality of post-optimization IRs of the functions associated with the software application further comprises:

program instructions to identify information associated with a prior compile of the software application, wherein the information associated with the prior compile of the software application includes an effectiveness status corresponding to an optimization routine respectively associated with the pre-optimization IR of the function; and responsive to determining that the effectiveness status corresponding to the optimization routine respectively associated with the pre-optimization IR of the function is not effective, program instructions to determine not to execute the optimization routine, dictated by the identified optimization level, on the pre-optimization IR of the function.

8. The computer program product of claim 7, further comprising:

responsive to determining that the effectiveness status corresponding to the optimization routine respectively associated with the pre-optimization IR of the function is effective, program instructions to execute the optimization routine, dictated by the identified optimization level, on the pre-optimization IR of the function.

9. The computer program product of claim 6, wherein program instructions to generate the plurality of post-optimization IRs of the functions associated with the software application further comprise:

program instructions to identify a previous hash value corresponding to the pre-optimization IR of the function associated with a prior compile of the software application;

program instructions to determine a pre-optimization hash value corresponding to the generated pre-optimization IR of the function; and responsive to determining that the pre-optimization hash value corresponding to the generated pre-optimization IR of the function differs from the previous hash value corresponding to the pre-optimization IR of the function associated with the prior compile of the software application, program instructions to determine to execute the dictates set of optimization routines on the pre-optimization IR of the function.

10. The computer program product of claim 6, further comprising:

program instructions to determine a pre-optimization hash value corresponding to a pre-optimization IR of a function from the plurality of generated pre-optimization IRs of the functions associated with the software application;

program instructions to determine a post-optimization hash value corresponding to a post-optimization IR of the function respectively associated with executing the dictated set of optimization routine on the pre-optimization IR of the function; and responsive to determining that the post-optimization hash value corresponding to the post-optimization IR of the function respectively associated with executing the optimization routine of the dictated set of optimization routines on the pre-optimization IR of the function differs from the pre-optimization hash value corresponding to the pre-optimization IR of the function, program instructions to assign a status of effective for the optimization routine respectively associated with the pre-optimization IR of the function.

11. A computer system for controlling a compile of a software application, the computer system comprising:

one or more computer processors;
one or more computer readable storage media; and
program instructions stored on the computer readable storage media for execution by at least one of the one or more computer processors, the program instructions comprising:

program instructions to generate, from source code corresponding to a software application, a plurality of pre-optimization intermediate representations (IRs) of functions associated with the software application;

program instructions to identify an optimization level to invoke while compiling the software application, wherein the optimization level dictates a set of optimization routines respectively applied to a pre-optimization IR corresponding to a function associated with the software application;

program instructions to generate a plurality of post-optimization IRs of the functions associated with the software application by executing dictated set of optimization routines on the plurality of pre-optimization IRs of functions, wherein the plurality of generated post-optimization IRs includes a quantity of post-optimization IRs corresponding to the function is based on the dictated set of optimization routines associated with the identified optimization level;

program instructions to determine a set of IRs of the functions, from among the plurality of generated pre-optimization IRs of the functions associated with the software application and the generated plurality of post-optimization IRs of the functions associated with the software application; and program instructions to convert a determined set of IRs of functions to an executable version of the software application.

12. The computer system of claim 11, wherein program instructions to generate the plurality of post-optimization IRs of the functions associated with the software application further comprises:

program instructions to identify information associated with a prior compile of the software application, wherein the information associated with the prior compile of the software application includes an effectiveness status corresponding to an optimization routine respectively associated with the pre-optimization IR of the function; and responsive to determining that the effectiveness status corresponding to the optimization routine respectively associated with the pre-optimization IR of the function is not effective, program instructions to determine not to execute the optimization routine, dictated by the identified optimization level, on the pre-optimization IR of the function.

13. The computer system of claim 12, further comprising:

responsive to determining that the effectiveness status corresponding to the optimization routine respectively associated with the pre-optimization IR of the function is effective, program instructions to execute the optimization routine, dictated by the identified optimization level, on the pre-optimization IR of the function.

14. The computer system of claim 11, wherein program instructions to generate the plurality of post-optimization IRs of the functions associated with the software application further comprise:

program instructions to identify a previous hash value corresponding to the pre-optimization IR of the function associated with a prior compile of the software application;

program instructions to determine a pre-optimization hash value corresponding to the generated pre-optimization IR of the function; and responsive to determining that the pre-optimization hash value corresponding to the generated pre-optimization IR of the function differs from the previous hash value corresponding to the pre-optimization IR of the function associated with the prior compile of the software application, program instructions to determine to execute the dictates set of optimization routines on.

15. The computer system of claim 11, further comprising:

program instructions to determine a pre-optimization hash value corresponding to a pre-optimization IR of a function from the plurality of generated pre-optimization IRs of the functions associated with the software application;

program instructions to determine a post-optimization hash value corresponding to a post-optimization IR of the function respectively associated with executing the dictated set of optimization routine on the pre-optimization IR of the function; and responsive to determining that the post-optimization hash value corresponding to the post-optimization IR of the function respectively associated with executing the optimization routine of the dictated set of optimization routines on the pre-optimization IR of the function differs from the pre-optimization hash value corresponding to the pre-optimization IR of the function, program instructions to assign a status of effective for the optimization routine respectively associated with the pre-optimization IR of the function.

* * * * *